(12) United States Patent
Tao et al.

(10) Patent No.: US 7,411,015 B2
(45) Date of Patent: Aug. 12, 2008

(54) PROCESS FOR PREVENTING GEL FORMATION IN LATTICES OF HYDROGENATED, LOW MOLECULAR WEIGHT, FUNCTIONALIZED ELASTOMERS

(75) Inventors: David D. H. Tao, Louisville, KY (US); Michael Gozdiff, North Canton, OH (US); Edmee Files, Floyds Knobs, IN (US)

(73) Assignee: Zeon Chemicals, L.P., Louisville, KY (US)

( * ) Notice: Subject to any disclaimer, the term of this patent is extended or adjusted under 35 U.S.C. 154(b) by 387 days.

(21) Appl. No.: 11/177,759

(22) Filed: Jul. 8, 2005

(65) Prior Publication Data

US 2007/0010605 A1    Jan. 11, 2007

(51) Int. Cl.
*C08K 5/00*    (2006.01)
(52) U.S. Cl. ...................................... 524/236; 524/565
(58) Field of Classification Search ................. 524/236, 524/565, 566; 525/329.1, 380
See application file for complete search history.

(56) References Cited

U.S. PATENT DOCUMENTS

| | | | | |
|---|---|---|---|---|
| 4,452,950 A | 6/1984 | Wideman | ................... | 525/339 |
| 5,039,737 A | 8/1991 | Parker et al. | ................. | 524/804 |
| 5,424,356 A | 6/1995 | Parker et al. | ................. | 524/555 |
| 5,442,007 A | 8/1995 | Parker et al. | ................. | 524/555 |
| 5,442,009 A | 8/1995 | Parker et al. | ................. | 524/555 |
| 6,521,694 B2 | 2/2003 | Belt et al. | ................... | 524/503 |
| 6,552,132 B2 | 4/2003 | Belt et al. | ................... | 525/338 |

*Primary Examiner*—Peter D Mulcahy
(74) *Attorney, Agent, or Firm*—Alvin T. Rockhill

(57) ABSTRACT

The present invention discloses a process for hydrogenating a latex of a low molecular weight functionalized, unsaturated elastomer to produce a latex of a hydrogenated, low molecular weight, low gel, functionalized elastomer, said process comprising hydrogenating the low molecular weight, functionalized, unsaturated elastomer in the presence of (1) an oxidant selected from the group consisting of oxygen and hydroperoxides, (2) a reducing agent selected from the group consisting of hydrazine and hydrazine hydrates, and (3) a metal ion activator, wherein a hydroxylamine is added to the latex of the low molecular weight, functionalized, unsaturated elastomer or to the latex of the hydrogenated, low molecular weight, functionalized elastomer prior, during, or subsequent to the hydrogenation to produce the latex of the hydrogenated low molecular weight, low gel, functionalized elastomer.

15 Claims, No Drawings

PROCESS FOR PREVENTING GEL FORMATION IN LATTICES OF HYDROGENATED, LOW MOLECULAR WEIGHT, FUNCTIONALIZED ELASTOMERS

FIELD OF THE INVENTION

The present invention relates to a new development for utilization in conjunction with the diimide reduction process for making functionalized low molecular weight, essentially liquid, hydrogenated elastomers. More specifically, this invention relates to a technique for reducing the gel content of such elastomers from levels of higher than 80 percent to lower than 10 percent.

BACKGROUND OF THE INVENTION

Functionalized hydrogenated elastomers offer the advantage of higher mechanical strength and higher levels of adhesion to a variety of substrates. Hydrogenated carboxylated nitrile rubber is an example of a functionalized elastomer that has been extensively studied using conventional noble metal-catalyzed hydrogenation processes, but very few studies have been conducted using the diimide reduction process.

The diimide reduction process comprises reacting an ethylenically unsaturated polymer in latex form with a reducing agent, an oxidant, and a metal catalyst. The diimide reduction process for unsaturated elastomers has been studied by chemists for more than 20 years. It was originally developed by Lawson G. Wideman at The Goodyear Tire & Rubber Company and was first described in U.S. Pat. No. 4,452,950. The diimide reduction process offers a number of advantages compared to conventional metal-catalyzed hydrogenation processes. For example, the diimide reduction can selectively hydrogenate double bonds without reducing functional groups, such as carboxyl groups, hydroxyl groups, epoxy groups, amide groups, and active halide functional groups, which makes it possible to produce different functionalized hydrogenated polymers. This process also has an advantage over metal-catalyzed hydrogenation, in that high-pressure reactors are not needed, and the desired hydrogenation reactions can be conducted at atmosphere pressure.

However, the diimide reduction process described in U.S. Pat. No. 4,452,950 has some deficiencies that excludes the used of elastomers hydrogenated using it in some applications. The most serious of these deficiencies is the result of a cross-linking reaction that occurs during the hydrogenation process. This cross-linking severely limits the number and types of applications in which hydrogenated elastomers made using the diimide reduction technique can be employed. This problem is compounded by the fact that further cross-linking occurs during subsequent coagulation steps which often renders the hydrogenated elastomer unsuitable for use in many applications. In view of these deficiencies, a great deal of research has been conducted over the years in an attempt to develop a technique to limit gel formation in elastomers that are hydrogenated using the diimide reduction process.

U.S. Pat. No. 5,039,737 reveals a process for treating hydrogenated lattices made utilizing the diimide reduction technique with ozone to reduce the level of gelled (crosslinked) polymer and to reduce the level of residual hydrazine present. U.S. Pat. No. 5,039,737 more specifically discloses a process for treating an emulsion of a crosslinked elastomeric polymer containing residual hydrazine to obtain a latex of soluble (uncrosslinked) elastomeric polymer having a reduced concentration of residual hydrazine therein, said process comprising the addition of ozone to said emulsion in an amount and under conditions which are sufficient for the ozone to react with the crosslinked elastomeric polymer and the residual hydrazine to produce a latex of soluble (essentially uncrosslinked) elastomeric polymer having a reduced level of residual hydrazine therein. However, this ozone treatment process is extremely difficult to implement and control in commercial applications. Additionally, the ozonolysis breaks double bonds in the polymer and results in treated polymer having terminal aldehyde end groups. In any case, it changes the polymer structure and some microgel still typically persists. Thus, this ozone treatment technique is not universally suitable in commercial applications.

U.S. Pat. No. 5,424,356, U.S. Pat. No. 5,442,007, and U.S. Pat. No. 5,442,009 disclose a technique for addressing the shortfalls associated with the ozone treatment process. This technique involves treating the ozonated latex with hydroxylamine in an amount and under conditions which are sufficient to convert the aldehyde end groups of the elastomeric polymer in the latex to oxime end groups. This results in the formation of an oximated polymer latex. Unfortunately, this process changes the structure of the polymer and microgel still continues to persist after treatment. Accordingly, this process is again not commercially viable in most applications.

U.S. Pat. No. 6,521,694 describes using a boron type catalyst in the diimide reduction process. The process described by U.S. Pat. No. 6,521,694 utilizes (1) a reducing agent selected from hydrazines and hydrazine-releasing compounds, (2) an oxidising compound, and (3) a catalyst, wherein the catalyst contains an element from group 13 of the Periodic Table of the Elements, such as boron. It is preferred for the catalyst to be chosen from the group consisting of borates, peroxiborates and boric acid ($H_3BO_3$). More preferably, the catalyst is boric acid. It is most preferred that boric acid is used in combination with a polyvinyl alcohol. Crosslinking and resulting gel formation are problems that also occur in cases where this type of catalyst system is implemented. Thus, the technique of U.S. Pat. No. 6,521,694 has limited commercial applicability.

U.S. Pat. No. 6,552,132 discloses a process for the hydrogenation of a polymer composed of diene monomer units and nitrile group containing monomer units, in which the hydrogenation in the form of an aqueous dispersion is carried out in the presence of hydrazine and an oxidizing compound, comprising breaking crosslinks formed as a result of the hydrogenation by adding after the hydrogenation a compound that satisfies formula I or by adding before, during or after the hydrogenation a compound that satisfies formula

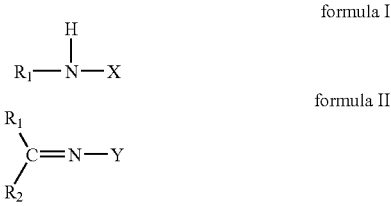

where $R_1$ is a hydrogen atom, an alkyl or cycloalkyl group with 1-30 carbon atoms, or an aromatic group with 6-30 carbon atoms and $R_2$ is an alkyl or cycloalkyl group with 1-30 carbon atoms, or an aromatic group with 6-30 carbon atoms, X is selected from the group consisting of —$R_3$, —$OR_4$, —$SR_4$, and —$NR_5R_6$, where $R_3$, $R_4$, and $R_5$ are a hydrogen atom, an alkyl or cycloalkyl group with 1-30 carbon atoms, or an aromatic group with 6-30 carbon atoms and $R_6$ is an alkyl or cycloalkyl group with 1-30 carbon atoms, or an aromatic group with 6-30 carbon atoms, Y is selected from the group consisting of —$R_7$, —$OR_8$, —$SR_8$, —$NR_9R_{10}$, and —$N=CR_{11}R_{12}$, where $R_7$, $R_8$, $R_9$, $R_{10}$, $R_{11}$, and $R_{12}$ are a hydrogen atom, an alkyl or cycloalkyl group with 1-30 carbon atoms, or an aromatic group with 6-30 carbon atoms, and wherein $R_3$-$R_{12}$ optionally contain one or more heteroatoms from the groups 13, 14, 15, 16, or 17 from the Periodic System of the Elements, and whereby the process is carrying out without using ozonolysis to break the crosslinks. However, the compounds used in this patent have limited effectiveness.

There is a continuing need for a technique to make hydrogenated lattices of elastomeric polymers without causing gel formation or changing the attributes of the polymer, such as by introducing unwanted functionality. There is a particular need for hydrogenated lattices of low molecular weight functionalized elastomers. For instance, functionalized hydrogenated rubber latex is of value in making resorcinol formaldehyde latex and fiber composites. It also can be coagulated and dried for utilization as a reactive functionalized liquid polymer for coatings, adhesives and polymer additives.

SUMMARY OF THE INVENTION

The present invention relates to a new development on the diimide reduction process for making a functionalized, low molecular weight, essentially liquid, hydrogenated elastomer. In addition, this invention relates to a new development which offers a significant improvement on reducing gel content levels from higher than 80 percent to lower than 10 percent, in some cases even providing a gel level of 0%, for functionalized liquid hydrogenated elastomers.

The present invention is based upon the unexpected discovery that dialkyl hydroxylamines and diaryl hydroxylamines are extremely effective for use in inhibiting the crosslinking side reaction that occurs in the diimide reduction of lattices containing low molecular weight functionalized elastomeric polymers. The dialkyl hydroxylamine or the diaryl hydroxylamine can be added to the latex of the low molecular weight elastomer before, during, or after the hydrogenation to attain a hydrogenated polymer having a low gel content which is typically within the range of 0% to 10%. This invention accordingly represents a significant improvement on the diimide reduction process for making functionalized liquid hydrogenated rubber with low gel contents. Lattices of hydrogenated, low molecular weight, functionalized elastomers having low gel contents made by employing the technique of this invention can also be coagulated to recover dry polymers having desirable targeted performance attributes.

Virtually any type of hydrogenated, low molecular weight, functionalized elastomer latex can be treated by the process of this invention. Normally the elastomer will contain at least one conjugated diolefin monomer, such as 1,3-butadiene or isoprene, and can optionally contain additional ethylenically unsaturated monomers, such as vinyl aromatic monomers. It will also typically contain repeat units that are derived from at least one monomer which contains a functional group, such as a carboxyl group, a hydroxyl group, an epoxy group, an amide group, an active halide functional group, and the like.

For example, the latex can be of a nitrile rubber, a carboxylated nitrile rubber, a carboxylated styrene-butadiene rubber, and the like. The molecular weight of the elastomeric polymer will typically be within the range of 500 to 20,000, will more typically be within the range of 1000 to 10,000, and will preferably be within the range of 3,000 to 8,000. Such hydrogenated rubbers will typically have a saturation level of about 80% to about 99%. It is preferred for the hydrogenated rubber to have a saturation level of about 90% to about 99%.

The present invention more specifically discloses a process for inhibiting gel formation in a latex of a hydrogenated, low molecular weight, functionalized elastomer which comprises adding an amine selected from the group consisting of dialkyl-hydroxylamines, diaryl-hydroxylamines, and alkyl, aryl-hydroxylamines to the latex of the hydrogenated, low molecular weight, functionalized elastomer.

The subject invention also reveals a process for hydrogenating a latex of a low molecular weight functionalized, unsaturated elastomer to produce a latex of a hydrogenated, low molecular weight, low gel, functionalized elastomer, said process comprising hydrogenating the low molecular weight, functionalized, unsaturated elastomer in the presence of (1) an oxidant selected from the group consisting of oxygen and hydroperoxides, (2) a reducing agent selected from the group consisting of hydrazine and hydrazine hydrates, and (3) a metal ion activator, wherein a member selected from the group consisting of dialkyl-hydroxylamines, diaryl-hydroxylamines, and alkyl,aryl-hydroxylamines is added to the latex of the low molecular weight, functionalized, unsaturated elastomer or to the latex of the hydrogenated, low molecular weight, functionalized elastomer prior, during, or subsequent to the hydrogenation to produce the latex of the hydrogenated low molecular weight, low gel, functionalized elastomer.

The present invention further discloses a latex of a low molecular weight, hydrogenated, nitrile rubber said latex being comprised of water, an emulsifier, and the low molecular weight, hydrogenated, nitrile rubber, wherein the low molecular weight, hydrogenated, nitrile rubber has a molecular weight which is within the range of 500 to 20,000, wherein the low molecular weight, hydrogenated, nitrile rubber has a gel content of less than 10%, and wherein the low molecular weight, hydrogenated, nitrile rubber has a saturation level of at least about 80%.

DETAILED DESCRIPTION OF THE INVENTION

The diimide reduction process comprises reacting an ethylenically unsaturated polymer in latex form with a reducing agent, a metal catalyst and an oxidant. The diimide reduction process is explained in detail in U.S. Pat. No. 4,452,950, the teachings of which are incorporated herein by reference in their entirety. The reducing agent is typically hydrazine, a hydrate of hydrazine, or a hydrazine-releasing compound. The oxidant is typically oxygen (which can be introduced as air), hydrogen peroxide, or a hydroperoxide, such as cumyl hydroperoxide, t-butyl hydroperoxide, p-menthane hydroperoxide, and the like. A metal ion or salt that will react with hydrazine and reduce to a lower valence state is used in the technique described in U.S. Pat. No. 4,452,950. Such metals include antimony, arsenic, bismuth, cerium, chromium, cobalt, copper, gold, iron, lead, manganese, mercury, molybdenum, nickel, osmium, palladium, platinum, polonium, selenium, silver, tellurium, tin, and vanadium. Iron and copper are preferred with copper being the most preferred. A copper salt, such as copper sulfate ($CuSO_4$) is normally used in commercial applications. The process disclosed in U.S. Pat. No. 6,521,694 employs a reducing agent, an oxidant, and a catalyst which contains an element from group 13 of the Periodic Table of the Elements, such as a boron compound. Boric acid ($H_3BO_3$) is preferred with it being most preferred to use it in combination with a polyvinylalcohol. The teachings of U.S. Pat. No. 6,521,694 are incorporated herein by reference in their entirety with respect to the diimide reduction process taught therein.

The unsaturated polymers that can be hydrogenated in latex form in accordance with the method of this invention are typically comprised of repeat units that are derived from 1 weight percent to 100 weight percent of a conjugated diene monomer, 99 weight percent to 0 weight percent of an ethylenically unsaturated monomer, and 1 weight percent to 20 weight percent of one or more reactive functional group-containing monomerss. Specific examples of the conjugated diene monomer are 1,3-butadiene, isoprene, chloroprene, alkyl substituted conjugated dienes, such as 2,3-dimethyl butadiene and 1,3-pentadiene. Some representative examples of some specific ethylenically unsaturated monomer include acrylonitrile, methacrylonitrile, styrene, α-alkyl styrenes, acrylic and methacrylic esters having an alkyl group containing from 1 to 20 carbon atoms, such as methyl methacrylate, butyl acrylate, and methoxyethyl acrylate. 2-ethylhexyl acrylate, octyl methacrylate, and the like.

As has been described, the diimide reduction process can selectively hydrogenate double bonds without reducing nitro, cyano, carboxyl and other functional groups, which allows it to incorporate polymerized-in functional group into polymer chain for making practically useful functionalized liquid hydrogenated polymers. The reactive functionalized polymer is able to form crosslinking in the hydrogenated polymer itself under desired condition or formation of chemical and physical bonds between the hydrogenated polymer and substrates, which has useful applications in the areas of coatings, adhesives, matrix of composites, polymer additives, and other applications. Examples of functional monomers that can be used in accordance with the present invention are carboxyl, hydroxyl, epoxy, amide and active halide containing monomers. The carboxyl monomer is an aliphatic or aromatic acid which contains 1 to 20 carbon atoms. The monomer can be a mono-carboxylic acid or a poly-carboxylic acid. Specific examples of such carboxylic acids include acrylic acid, methacrylic acid, ethacrylic acid, crotonic acid, 2-pentanoic acid, maleic acid, fumaric acid, mesaconic acid, itaconic acid, 3-buttene-1,2,3-tricarboxylic acid, vinylbenzoic acid, and the like. Specific examples of hydroxyl group containing monomers include hydroxyethyl methacrylate, hydroxybutyl methacrylate, hydroxybutyl acrylate, 2-hydroxypropyl acrylate, and N-methylolacrylamide. Examples of epoxy group containing monomers include glycidyl acrylate, glycidyl methacrylate, and allyl glycidyl ether. Examples of amide and active halide group containing monomer include acrylamide, methacrylamide, vinylbenzyl chloride, vinyl chloroacetate, chloroethyl vinyl ether, and the like.

The unsaturated polymer may be prepared by any polymer synthesis method, such as emulsion polymerization, solution polymerization, suspension polymerization, non-aqueous dispersion polymerization, vapor phase polymerization, and bulk polymerization. Polymer prepared from solution, non-aqueous, vapor phase, or bulk polymerization needs to be converted to latex form by any known process so that they can subsequently be hydrogenated by the diimide reduction process. It is accordingly preferred for the polymer to be synthesized by aqueous emulsion polymerization so that the resulting polymer latex can be directly used in the diimide reduction process.

Conventional cold or hot emulsion recipes may be employed to prepare the unsaturated polymer in latex form. Ionic surfactants, of known common types, including fatty acid, sulfonate, sulfate, and phosphate surfactants are useful in the present invention. The level of ionic surfactant is computed based upon the total weight of monomers charged and ranges from 1 to 20 parts by weight of ionic surfactant per 100 parts by weight of monomer (phm) with 1-15 phm being more preferred and 2-10 phm being most preferred. A known initiator for free radical polymerization is employed. For example, persulfate systems and azonitrile systems are conventionally used in hot emulsion recipes. Examples of persulfate system are sodium persulfate, ammonium persulfate, and examples of azonitrile are 2,2'-azobis(2-methylpropanenitrile), 2,2'-azobis(2,4-dimethylpropanenitrile), 2,2'-azobis(2-methylbutanenitrile), and the like. Free radical initiators used in cold emulsion recipes include organic hydroperoxides. Representative of organic hydroperoxides are cumene hydroperoxide, paramenthane hydroperoxide, diisopropylbenzene hydroperoxide, pinene hydroperoxide, and tertiary butyl hydroperoxide. In cold polymerization, activator is used to produce free radicals efficiently at temperature lower than 25° C. Examples of activator system are a combination of chelated iron salts and formaldehyde sulfoxylate, or dimethylamine. Free radical produced by initiator and activator is called redox reaction. The activator recipes are often varied so that the polymerization is controlled in a desired rate. It may be advisable to polymerize at such an initiator level that, at reaching the desired conversion, the initiator is nearly consumed. This may, for instance, be effectuated by choosing a low ratio of the initiator level to the activator level.

The temperature of the emulsion polymerization may range from 1° C. to 99° C. If a hot polymerization recipe is used, the temperature of the polymerization generally ranges from about 40° C. to about 90° C. Preferably, the temperature of the hot polymerization ranges from about 25° C. to about 80° C. with a range from about 50° C. to about 70° C. being particularly preferred. The temperature of the cold polymerization generally ranges from about 0° C. to 25° C. Preferably, the temperature of the cold polymerization ranges from about 5° C. to 20° C. with a range of from about 5° C. to 10° C. being particularly preferred. The polymerization is generally carried out to monomer conversion ranging from about 70 to 100 percent.

In the practice of this invention polymerization is deliberately conducted in a manner that results in the synthesis of a low molecular weight polymer which can be fluid (liquid) in nature. The desired number average molecular weight in the present invention is in the approximate range of 500 to 20,000. Preferably, the number molecular weight ranges from about 1000 to 10,000. Most preferably, number average molecular weight ranges from 3,000 to 8,000. A chain transfer agent is applied in the polymerization recipe to obtain the needed low molecular weight polymer. Specific examples of chain transfer agent include sulfur-containing compounds, such as tertiary dodecyl mercaptan, triisobutyl mercaptan, n-dodecyl mercaptan, and diisopropyl xanthogen disulfide. The level of chain transfer agent is calculated based upon the total weight of monomers charged and ranges from 1 to 20 parts by weight of chain transfer agent per 100 parts by weight of monomer (phm) with 3-15 phm being more preferred and 5-10 phm being most preferred. The solids content of the polymer latex used in the diimide hydrogenation can range from 1 to 70% by weight, and is preferably within the range of 30% to 50% by weight.

As has previously been explained, the diimide reduction is conducted using a reducing agent, a metal catalyst, and an oxidant. It is preferably carried out in an open vessel by first adding the reducing agent into the unsaturated polymer latex and subsequently proportioning the oxidant into latex in a way that the desired diimide hydrogenation rate is achieved. The reaction temperature is typically within the range of 0° C. to 200° C., preferably 20° C. to 80° C. Pressure vessels are not required and atmosphere pressure is preferred.

The reducing agent includes hydrazine, hydrazine hydrate, hydrazine acetate, hydrazine sulfate, and any hydrazine-containing compound. Preferably hydrazine hydrate is used in the diimide hydrogenation reaction. The level of hydrazine hydrate is calculated based upon the total moles of unsaturated carbon-carbon double bond in the polymer and it ranges from 50 to 250 moles of hydrazine hydrate per 100 moles of carbon-carbon double bond with 80 to 150 moles per 100 moles of double bond being more preferred. The oxidant is typically utilized at a molar ratio of 0.1:1 to 3:1 relative to hydrazine compound.

The degree of hydrogenation is the percentage of carbon-carbon double bonds that is saturated after the hydrogenation reaction compared to the initial amount of carbon-carbon double bonds. The process in the present invention provides hydrogenated polymers that have degree of hydrogenation from 40% to 100%, preferably the degree of hydrogenation is higher than 70%, more preferably the degree of hydrogenation is higher than 90%.

The process in the present invention produces hydrogenated polymer with low gel content by using a dialkyl hydroxylamine, a diaryl hydroxylamine, or an alkyl, aryl-hydroxylamine compound of the structure:

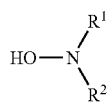

$R^1$ and $R^2$ can be alkyl or cycloalkyl groups containing from 1 to 30 carbon atoms, or aromatic groups containing from 6 to 40 carbon atoms. $R^1$ can be the same or different from $R^2$. In the case of alkyl, aryl-hydroxylamines $R^1$ represents an alkyl group and $R^2$ represents an aryl group. The term "alkyl group" as used herein is an organic moiety that contains only carbon and hydrogen atoms which are arranged in a straight or branched chain. Alkyl groups are of the general formula —$C_nH_{2n+1}$ wherein n is an integer that represents the number of carbon atoms in the alkyl group. Some representative examples of alkyl groups include methyl groups, ethyl groups, normal-propyl groups, iso-propyl groups, normal-butyl groups, iso-butyl groups, and tertiary-butyl groups. The term "aryl group" as used herein is an organic moiety that is derived from an aromatic compound such as benzene, naphthalene, anthracene, or phenanthrene. Phenyl groups are representative examples or aryl groups that can be used. The aryl group can be substituted with an alkyl group or a functional group (—$NO_2$). Specific examples of the above compound are N,N-dimethyl hydroxylamine, N,N-diethyl hydroxylamine, N,N-dibutyl hydroxylamine, N-methyl, N-phenyl-hydroxylamine, N,N-(1,8-Naphthalyl)hydroxylamine, N,N-Bis-benzotriazol-1-ylmethyl-hydroxylamine, N-Tert-butyl-N-(3,5-dinitro-phenyl)-hydroxylamine and the like. Some additional examples of dialkyl-hydroxylamines and diaryl hydroxylamines that can be used include bis(octadecyl)hydroxylamine, N,N-Dipentadecyl-hydroxylamine, and N-Tert-butyl-N-(3,5-dinitro-phenyl)-hydroxylamine.

It is believed that free radicals produced by the oxidants used in the diimide reduction process are one of the primary sources responsible for crosslinking during the hydrogenation process. The dialkyl hydroxylamines and diaryl hydroxylamines used in the method of this invention are believed to act as radical scavengers which can eliminate several free radicals by one molecule on either its one N-alkyl side or its two N-alkyl side. The mechanism of radical scavenging by a dialkyl hydroxylamine is shown below.

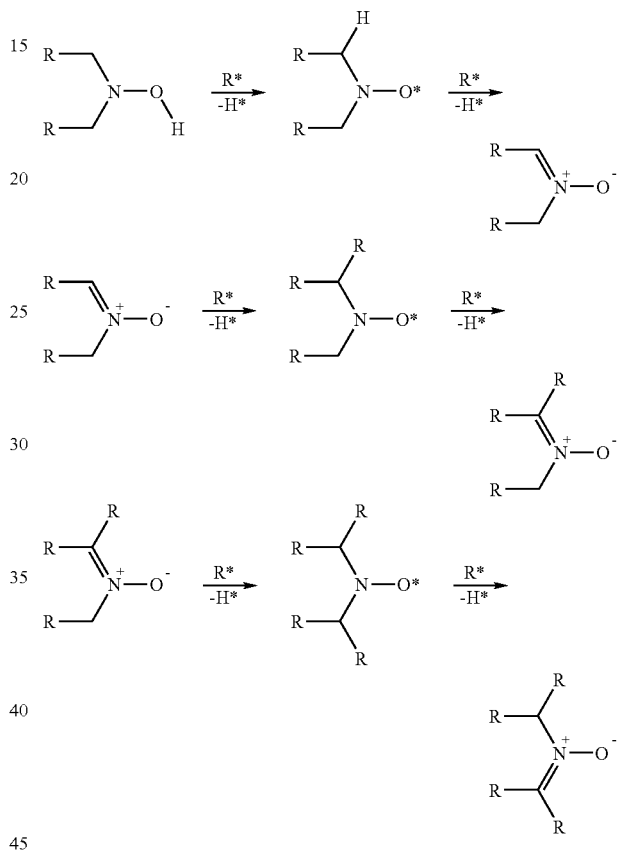

Addition of dialkyl hydroxylamine or diaryl hydroxylamine efficiently inhibits the cross-linking reaction in the diimide reduction process. The amount of hydroxylamine compound used in the present invention is computed based upon the total moles of double bond in the polymer latex and ranges from 1 to 30 moles of dialkyl hydroxylamine or diaryl hydroxylamine per 100 moles of double bond with 5-15 moles being more preferred. The dialkyl hydroxylamine or diaryl hydroxylamine is added into the polymer latex before or during the diimide reduction process. It is also useful in reducing the gel content of the hydrogenated polymer to add the dialkyl hydroxylamine or diaryl hydroxylamine compound right after completing the hydrogenation process. Preferably, it is added into the polymer latex before starting the diimide reduction.

The residual hydrazine in the latex after the diimide hydrogenation can be eliminated by adding ozone to the hydrogenated latex, which can be accomplished by bubbling ozone through the latex while rapidly agitating the hydrogenated polymer latex. The ozone treatment will be carried out for a time which is sufficient to reduce the quantity of undesirable residual hydrazine to the desired low level. Specifically the level of residual hydrazine after ozonolysis should normally be within the range of 0 ppm to 200 ppm, and preferably 0 ppm to 100 ppm. The teachings of U.S. Pat. No. 5,039,737 for reducing the level of residual hydrazine with ozone are incorporated herein by reference. However, it should be noted that the latex will typically be void of ozone during the diimide reduction and at the time that the latex is treated with the dialkyl hydroxylamine or the diaryl hydroxylamine. A different process that can be used to eliminate residual hydrazine is to add additional hydrogen peroxide. The molar ratio of additional hydrogen peroxide to hydrazine used for such a purpose will typically be within the range of 0.1:1 to 1:1 and will preferably be within the range of 0.3:1 to 0.5:1.

The primary targeted applications for the low molecular weight, hydrogenated elastomeric polymers of the present invention are as hydrogenated polymer-compatible binders for difficult-to-disperse reinforcement filler masterbatches. A specific example of such an application is to make a hydrogenated carboxylated acrylonitrile butadiene (XHNBR) latex to be used as a hydrogenated acrylonitrile butadiene (HNBR)-compatible binder. Other applications include use as a supplemental additive latex in high performance resorcinol-formaldehyde latex (RFL) adhesive dips. After being coagulated and dried, the polymer can be used as a reactive liquid hydrogenated polymer for specialized plasticizer/tackifier/processing aids in polymer, polymer composite, coating and adhesive applications.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Preparation of Carboxylated Liquid NBR Latex

In this experiment a general emulsion polymerization technique was applied. The polymerization was carried out in a 10-liter reactor at a temperature of 20° C. and under a pressure of about 150 pounds per square inch. A pre-made emulsifier solution containing 208 grams of Dowfax® 2A1 ionic surfactant, 0.5 grams of sodium sulfate, 1.0 grams of Versene® 100 chelating agent, and 1.1 grams of sulfuric acid were charged into the reactor. It was followed by charging 2335 grams of deionized water, 910 grams of acrylonitrile, 78 grams of methacrylic acid, and 1612 grams of 1,3-butadiene into the reactor. Then, 208 grams of tertiary dodecyl mercaptan was added into reactor before the polymerization was initiated. The activator solution containing 0.28 grams of sodium ferrous ethylenediamine tetraacetate, 1.93 grams of sodium formaldehyde sulfoxylate, and 5.16 grams of deionized water were added to reactor along with 1.7 grams of cumene hydroperoxide for initiation of polymerization. The polymerization was run for approximately 12 hours and ended at 85% conversion using sodium nitrite. The pH of the latex was adjusted to 10.5 by adding a 5% potassium hydroxide (KOH) solution. The polymer latex had the following properties:

| | |
|---|---|
| Solids Content | 34.5% |
| pH | 10.5 |
| Brookfield Viscosity | 25 cps |
| Surface Tension | 39.5 dynes/cm$^2$ |
| Number Average Molecular Weight | 4200 |
| Bound Acrylonitrile | 31.1% |

EXAMPLE 2

Diimide Reduction to Make Hydrogenated Polymer

A 1 liter three-necked round bottom flask equipped with a mechanical paddle stirrer, thermometer, gas bubbling outlet and an inlet tube for feeding hydrogen peroxide solution was used for the diimide reduction. A water bath was used to heat the flask and to maintain a relatively constant temperature.

In the procedure used, 500 grams of the NBR latex (2.11 moles of double bonds) synthesized in Example 1, 2.6 grams of 2% copper sulfate pentahydrate solution, and 1.3 grams of Dowfax® 2A1 surfactant were charged into the reactor. With agitation, 137.4 grams of hydrazine hydrate (2.54 moles) and 4.7 grams of 85% diethyl hydroxylamine solution (0.045 moles) were added into the latex. The mixture was then heated in the water bath to a temperature which was within the range of 40° C. to 50° C. before beginning the addition of 242.9 grams (3.4 moles) of a 50% aqueous hydrogen peroxide solution drop by drop by means of a variable speed peristaltic pump over a 6 hour period. After completing the addition of the hydrogen peroxide, 0.015 moles of ozone were passed through the latex at temperature of 50° C. The pH of final latex was adjusted to 10.5 to 11.5 by adding a 5% aqueous potassium hydroxide (KOH) solution. Analysis of the reduced polymer indicated that a reduction of approximately 85-90% of the double bonds had been achieved. The hydrogenated nitrile rubber latex had the following properties:

| | |
|---|---|
| Solids Content | 19.5% |
| pH | 11 |
| Brookfield Viscosity | 9.8 cps |
| Surface Tension | 35.2 dynes/cm$^2$ |
| Degree of Hydrogenation | 92.4% |
| Gel Content | 0% |

This experiment shows that the diethyl hydroxylamine was extremely effective at preventing crosslinking from occurring. This is evidenced by the fact that a gel content of 0% was maintained.

EXAMPLE 3

The reaction conditions of Example 2 were repeated except that the diethyl hydroxylamine was replaced by 2.93 grams of hydroxylamine hydrochloride (0.030 moles).

| | |
|---|---|
| Solids Content | 19.8% |
| pH | 10.6 |
| Brookfield Viscosity | 10.6 cps |
| Surface Tension | 36.5 dynes/cm$^2$ |
| Degree of Hydrogenation | 92.6% |
| Gel Content | 5.6% |

EXAMPLE 4

The reaction conditions of Example 2 were repeated except that the ozonolysis step was replaced by adding additional 55 grams of hydrogen peroxide (0.81 moles) dropwise at 50° C. for 1 hour.

| | |
|---|---|
| Solids Content | 18.5% |
| pH | 10.9 |
| Brookfield Viscosity | 9.5 cps |
| Surface Tension | 35.0 dynes/cm$^2$ |
| Degree of Hydrogenation | 93.5% |
| Gel Content | 0% |

This experiment shows that the hydrogenated latex can be treated with hydrogen peroxide without having an adverse effect on gel content. In fact, in this experiment where the latex was treated with hydrogen peroxide a gel content of 0% was maintained.

COMPARATIVE EXAMPLE 5

Diimide Reduction with Boric Acid and Octylated Diphenylamine

A 500 milliliter three-necked round bottom flask equipped with a mechanical paddle stirrer, a thermometer, a gas bubbling outlet, and an inlet tube for feeding hydrogen peroxide solution was used in this experiment for the diimide reduction. A water bath was used for heat exchange and to maintain a relatively constant temperature.

In the procedure used 100 grams of Nysin™ 33-3 NBR latex having a 22.3% total solids content and containing 32.5% bound acrylonitrile (0.279 moles of double bonds) was charged into the reactor. With agitation, 1.90 grams of boric acid pre-dissolved in 15.2 grams of water, 2.20 grams of Agerite Stalite® emulsion (40.5% solids of octylated diphenylamine solution), and 22.7 grams of hydrazine hydrate (0.45 moles) were added into the latex. The mixture was then heated in a water bath to 40° C. to 50° C. before beginning the addition of 35.5 grams (0.52 moles) of 50% aqueous hydrogen peroxide dropwise by means of a variable speed peristaltic pump over a 4 hour period. After completing the addition of hydrogen peroxide, 0.003 moles of ozone were passed through the latex at a temperature of 50° C. The pH of final latex was adjusted to 10.5 and 11.5 by adding a 5% aqueous potassium hydroxide (KOH) solution. Analysis of the reduced polymer indicated that approximately 85-90% of the double bonds had been hydrogenated. The hydrogenated nitrile rubber latex was determined to have the following properties:

| | |
|---|---|
| Solids Content | 8.5% |
| pH | 10.6 |
| Brookfield Viscosity | 8.0 cps |
| Surface Tension | 35.6 dynes/cm$^2$ |
| Degree of Hydrogenation | 88.4% |
| Gel Content | 80% |

This experiment shows that the octylated-diphenylamine was not effective for the purpose of limiting crosslinking and gel formation. In fact, as can be seen above, an extremely high gel content of 80% was encountered.

While certain representative embodiments and details have been shown for the purpose of illustrating the subject invention, it will be apparent to those skilled in this art that various changes and modifications can be made therein without departing from the scope of the subject invention.

What is claimed is:

1. A process for inhibiting gel formation in a latex of a hydrogenated, low molecular weight, functionalized elastomer which comprises adding an amine selected from the group consisting of dialkyl-hydroxylamines, diaryl-hydroxylamines, and alkyl,aryl-hydroxylamines to the latex of the hydrogenated, low molecular weight, functionalized elastomer, wherein the amine is of the structural formula:

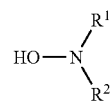

wherein R$^1$ and R$^2$ can be the same or different and are selected from the group consisting of alkyl groups containing from 1 to 30 carbon atoms, cycloalkyl groups containing from 1 to 30 carbon atoms, and aromatic groups containing from 6 to 40 carbon atoms.

2. A process as specified in claim 1 wherein the amine is added at a level which is within the range of 1 phr to 20 phr.

3. A process as specified in claim 1 wherein the amine is added at a level which is within the range of 1 phr to 5 phr.

4. A process as specified in claim 1 wherein the amine is a dialkyl-hydroxylamine, and wherein R$^1$ and R$^2$ can be the same or different and are selected from the group consisting of alkyl groups containing from 1 to 30 carbon atoms and cycloalkyl groups containing from 1 to 30 carbon atoms and aromatic groups containing from 6 to 40 carbon atoms.

5. A process as specified in claim 1 wherein the amine is a diaryl-hydroxylamine, and wherein R$^1$ and R$^2$ can be the same or different and are selected from aromatic groups containing from 6 to 40 carbon atoms.

6. A process as specified in claim 1 wherein the amine is selected from the group consisting of N,N-dimethyl hydroxylamine, N,N-diethyl hydroxylamine, N,N-dibutyl hydroxylamine, N-methyl, phenyl-hydroxyl amine, 2,4-dinitrophenyl hydroxylamine, tert-butyl N-hydroxycarbamate, bis(octadecyl)hydroxylamine, N,N-Dipentadecyl-hydroxylamine, and N-Tert-butyl-N-(3,5-dinitro-phenyl)-hydroxylamine.

7. A process as specified in claim 1 wherein the hydrogenated, low molecular weight, functionalized elastomer has a number average molecular weight which is within the range of about 500 to about 20,000.

8. A process as specified in claim 7 wherein the hydrogenated, low molecular weight, functionalized elastomer is a nitrile rubber.

9. A process as specified in claim 1 wherein the hydrogenated, low molecular weight, functionalized elastomer has a number average molecular weight which is within the range of 1000 to 10,000.

10. A process as specified in claim 1 wherein the hydrogenated, low molecular weight, functionalized elastomer has a number average molecular weight which is within the range of 3000 to 8,000.

11. A process for hydrogenating a latex of a low molecular weight functionalized, unsaturated elastomer to produce a latex of a hydrogenated, low molecular weight, low gel, functionalized elastomer, said process comprising hydrogenating the low molecular weight, functionalized, unsaturated elastomer in the presence of (1) an oxidant selected from the group consisting of oxygen and hydroperoxides, (2) a reducing agent selected from the group consisting of hydrazine and hydrazine hydrates, and (3) a metal ion activator, wherein an amine selected from the group consisting of dialkyl-hydroxylamines, diaryl-hydroxylamines, and alkyl,aryl-hydroxylamines is added to the latex of the low molecular weight, functionalized, unsaturated elastomer or to the latex of the hydrogenated, low molecular weight, functionalized elastomer prior, during, or subsequent to the hydrogenation to produce the latex of the hydrogenated low molecular weight, low gel, functionalized elastomer, wherein the amine is of the structural formula:

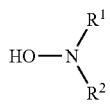

wherein $R^1$ and $R^2$ can be the same or different and are selected from the group consisting of alkyl groups containing from 1 to 30 carbon atoms, cycloalkyl groups containing from 1 to 30 carbon atoms, and aromatic groups containing from 6 to 40 carbon atoms.

12. A process as specified in claim 11 wherein the amine is added at a level which is within the range of 1 mole to 30 moles per 100 moles of double bonds in the low molecular weight, functionalized, unsaturated elastomer.

13. A process as specified in claim 11 wherein the amine is added at a level which is within the range of 5 moles to 30 moles per 100 moles of double bonds in the low molecular weight, functionalized, unsaturated elastomer.

14. A process as specified in claim 11 wherein the hydrogenated, low molecular weight, functionalized elastomer is a nitrile rubber.

15. A process as specified in claim 14 wherein the hydrogenated, low molecular weight, functionalized elastomer has a number average molecular weight which is within the range of 1000 to 10,000.

* * * * *